US012665263B1

(12) United States Patent
Qi et al.

(10) Patent No.: US 12,665,263 B1
(45) Date of Patent: Jun. 23, 2026

(54) BUSBAR WELDING DEVICE

(71) Applicant: Guangdong Lyric Robot Automation Co., Ltd., Guangdong (CN)

(72) Inventors: Hong Qi, Guangdong (CN); Junxiong Zhou, Guangdong (CN); Junjie Zhou, Guangdong (CN); Haisheng Cai, Guangdong (CN); Xiaotao Xu, Guangdong (CN); Wanji Chen, Guangdong (CN)

(73) Assignee: GUANGDONG LYRIC ROBOT AUTOMATION CO., LTD., Guangdong (CN)

( * ) Notice: Subject to any disclaimer, the term of this patent is extended or adjusted under 35 U.S.C. 154(b) by 3 days.

(21) Appl. No.: 17/908,229

(22) PCT Filed: Jul. 8, 2022

(86) PCT No.: PCT/CN2022/104660
§ 371 (c)(1),
(2) Date: Aug. 30, 2022

(87) PCT Pub. No.: WO2024/000624
PCT Pub. Date: Jan. 4, 2024

(30) Foreign Application Priority Data

Jun. 28, 2022 (CN) .......................... 202221640734.2

(51) Int. Cl.
*H01M 50/516* (2021.01)
(52) U.S. Cl.
CPC ................................. *H01M 50/516* (2021.01)
(58) Field of Classification Search
None
See application file for complete search history.

(56) References Cited

U.S. PATENT DOCUMENTS 3,889,095 A * 6/1975 Egan ..................... B65G 17/126
198/840

FOREIGN PATENT DOCUMENTS

CN          108539243 A          9/2018
CN          108772638 A     *   11/2018     ............. B23K 26/21
(Continued)

OTHER PUBLICATIONS

Translation of CN-114473347-A (Year: 2022).*
(Continued)

*Primary Examiner* — Elizabeth M Kerr
(74) *Attorney, Agent, or Firm* — FENWICK & WEST LLP

(57) ABSTRACT

The present disclosure discloses a busbar welding device comprising a rack, a positioning mechanism, a compressing mechanism and a welding mechanism. The positioning mechanism is located at the bottom of the rack and comprises a base, a conveying mechanism and a positioning plate. The conveying mechanism is arranged on the base and capable of conveying/receiving a battery module to/from the position above the positioning plate. A jacking part capable of elevating is arranged on the base. The positioning plate is located on the base and capable of positioning the battery module in a length direction and a width direction. The compressing mechanism comprises pressing plates movably arranged on the rack and capable of movably compressing busbars of the battery module located on the positioning plate. The welding mechanism is movably arranged on the rack and used for welding the busbars. The positioning plate positions the battery module in the length direction and the width direction and then compresses the busbars of the battery module by the pressing plates. There is no need to compress each busbar before welding it after positioning performed by the positioning plate so that the welding (Continued)

efficiency is improved, and the welding quality and precision are better.

9 Claims, 6 Drawing Sheets

(56)                    References Cited

FOREIGN PATENT DOCUMENTS

| CN | 212217562 | U | | 12/2020 | |
|----|-----------|---|---|---------|---|
| CN | 214641029 | U | | 11/2021 | |
| CN | 215880338 | U | * | 2/2022 | |
| CN | 114473347 | A | * | 5/2022 | ............ B23K 37/04 |
| JP | 2020-127001 | A | | 8/2020 | |

OTHER PUBLICATIONS

Translation of CN-215880338-U (Year: 2022).*
Translation of CN-108772638-A (Year: 2018).*
Patent Cooperation Treaty, International Search Report, PCT Application No. PCT/CN2022/104660, Dec. 16, 2022, six pages.
Patent Cooperation Treaty, Written Opinion of the International Searching Authority, PCT Application No. PCT/CN2022/104660, Dec. 20, 2022, seven pages.

* cited by examiner

BUSBAR WELDING DEVICE

TECHNICAL FIELD

The present disclosure relates to the technical field of welding, particularly to a busbar welding device.

BACKGROUND

With the increasing pursuit of sustainable and clean energy, traditional fossil energy can no longer meet people's needs. As a type of clean energy, new energy has the advantages of being efficient, clean, safe, reliable, etc., and has become a hot spot of energy development. At present, cells of existing battery modules, and the modules are respectively connected with each other through conductors. The conductor parts used for implementing serial and parallel connection of batteries are called busbars.

In the production of existing battery modules, busbars are connected to cell posts in a welding manner. Due to the welding mode in the prior art, the busbars and the posts need to be compressed one by one, thereby causing a low welding efficiency.

SUMMARY

The objective of the present disclosure is to at least solve one of the technical problems existing in the prior art, and provide a busbar welding device.

A busbar welding device in the first embodiment of the present disclosure, comprising a rack, a positioning mechanism, a compressing mechanism and a welding mechanism, wherein the positioning mechanism is located at the bottom of the rack and comprises a base, a conveying mechanism and a positioning plate. The conveying mechanism is arranged on the base and capable of conveying/receiving a battery module to/from the position above the positioning plate. A jacking part capable of elevating is arranged on the base. The positioning plate is located on the base and capable of positioning the battery module in a length direction and a width direction. The compressing mechanism comprises pressing plates movably arranged on the rack and capable of movably compressing busbars of the battery module located on the positioning plate. The welding mechanism is movably arranged on the rack and used for welding the busbars.

Beneficial effects: according to the busbar welding device, the battery module is placed on the conveying mechanism as an incoming material through a tray, then the jacking part retracts, the battery module and the tray fall onto the positioning plate which positions the battery module in the length direction and the width direction, and then the busbars of the battery module are compressed by the pressing plate. All the busbars are compressed by the pressing plates on the whole after well positioning, and then the busbars are welded through the welding mechanism. There is no need to compress each busbar before welding after positioning by the positioning plate so that the welding efficiency is improved, and the welding quality and precision are better.

The busbar welding device in the first embodiment of the present disclosure, wherein a first benchmark part arranged along the length direction of the positioning plate and a second benchmark part arranged along the width direction of the positioning plate are provided on the positioning plate. A first positioning part opposite to the first benchmark part and capable of moving close to or away from the first benchmark part is arranged on the base, and a second positioning part corresponding to the second benchmark part and capable of moving close to or away from the second benchmark part is arranged on the base.

The busbar welding device in the first embodiment of the present disclosure, wherein the positioning mechanism comprises a first drive member and a second drive member. The first drive member is used for driving the first positioning part to move along the length direction, and the second drive member is used for driving the second positioning part to move along the width direction.

The busbar welding device in the first embodiment of the present disclosure, wherein the conveying mechanism comprises a third drive member, a conveying main shaft and first conveying chain components. The first conveying chain components are arranged at the two opposite sides of the base, the conveying main shaft and the conveying chain components are connected through second conveying chain components, and one end of each first conveying chain component is rotatably connected with the conveying main shaft.

The busbar welding device in the first embodiment of the present disclosure, wherein the rack comprises first supporting beams arranged along the length direction, second supporting beams arranged along the width direction, and pillars. The first supporting beams and the second supporting beams are supported by the pillars. The welding mechanism comprises a first linear module, a second linear module, an elevating module and a laser welding part. The first linear module is arranged along the first supporting beams, the second linear module is slidable along the first linear module, and the elevating module is movable along the second linear module and capable of driving the laser welding part to vertically move.

The busbar welding device in the first embodiment of the present disclosure, wherein the laser welding part includes a laser module and an air knife arranged at one side of the laser module.

The busbar welding device in the first embodiment of the present disclosure, wherein the welding mechanism also includes ranging components which are located at one side of the laser welding part.

The busbar welding device in the first embodiment of the present disclosure, wherein the welding mechanism also includes a copper mouth pressing head module capable of moving along the length direction of the first supporting beams and comprising a copper mouth pressing block for compressing a single busbar, and the copper mouth pressing block can be used for dust drawing.

The busbar welding device in the first embodiment of the present disclosure, wherein the compressing mechanism further includes a first linear component for driving the pressing plates to move along the length direction of the battery module.

The busbar welding device in the first embodiment of the present disclosure, the busbar welding device further includes a visual positioning module capable of moving along the length direction and the width direction of the battery module so as to locate the welding position.

BRIEF DESCRIPTION OF DRAWINGS

The present disclosure will be further described with reference to the accompanying drawings and embodiments.

Figure 1:
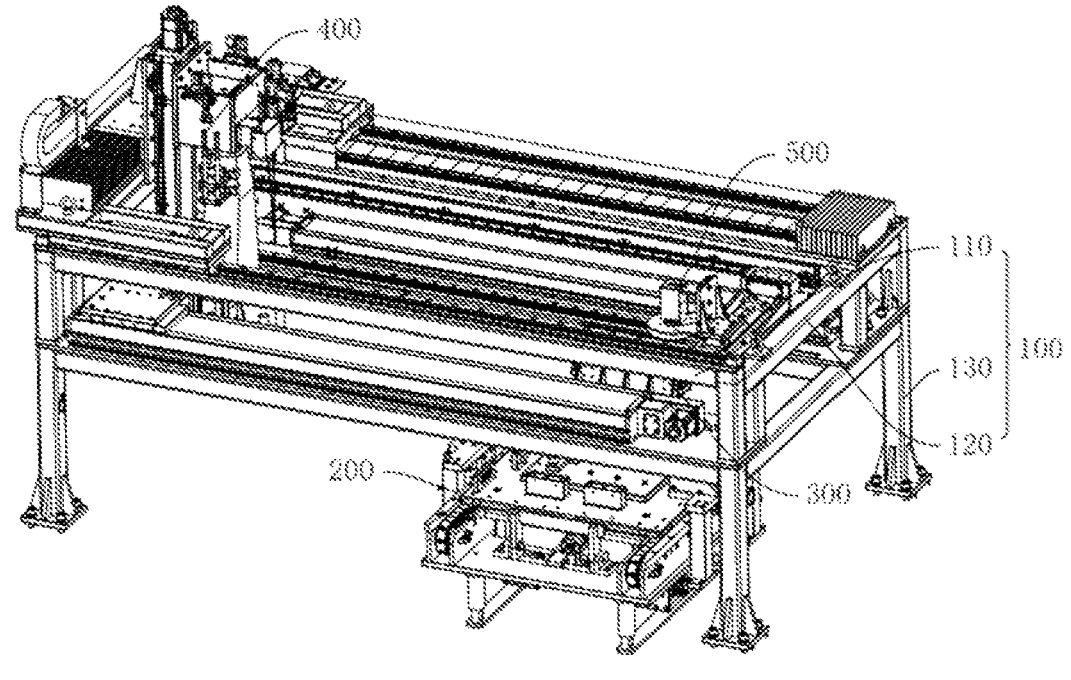
FIG. 1 is a schematic diagram 1 showing the busbar welding device in the embodiment of the present disclosure.

REFERENCE SIGNS rack 100, first supporting beam 110, second supporting beam 120, pillar 130;
positioning mechanism 200;
base 210, first positioning part 211, second positioning part 212;
conveying mechanism 220, third drive member 221, conveying main shaft 222, first conveying chain component 223, second conveying chain component 224;
positioning plate 230, first benchmark part 231, second benchmark part 232;
first drive member 240;
second drive member 250;
compressing mechanism 300, pressing plate 310, first linear component 320;
welding mechanism 400, first linear module 410, second linear module 420, elevating module 430, laser welding part 440, ranging component 450, copper mouth pressing head module 460, copper mouth pressing block 461;
laser module 441, air knife 442; and
visual positioning module 500.

DETAILED DESCRIPTION OF EMBODIMENTS

This part will describe the specific embodiments of the present disclosure in detail. The preferred embodiments of the present disclosure are illustrated in the accompanying drawings which are used for supplementing the text of the description with graphics so that people can visually and vividly understand all the technical features and the entire technical scheme of the present disclosure, but not for limiting the scope of patent protection of the present disclosure.

Hereafter to understand in the description of the present disclosure is that orientation descriptions involving, e.g. up, down, front, back, left, right, etc. for indicating orientations or positional relationship are based on those shown in the accompanying drawings and only intended to facilitate and simplify the description of the present disclosure, not to indicate or imply that a device or an element referred to must have a particular orientation, be constructed and operated in a particular orientation, and thus cannot be understood as the limitation of the present disclosure.

In the description of the present disclosure, a number means one or more, multiple means more than two, greater than, less than, more than, etc. are understood to exclude this number, and above, below, within, etc. are understood to include this number. The description to the first and the second is only used for distinguishing technical features, not for being understood as indicating or implying relative importance or implicitly specifying the number or the sequence of technical features referred to.

In the description of the present disclosure, the words such as set, mount, connect, etc. should be understood in a broad sense unless definite expression, and a person skilled in the prior art can reasonably determine the specific meaning of the words in the present disclosure in terms of the specific content of the technical scheme.

Battery modules are widely used in the field of electric vehicles for their advantages of high energy density, long service life, great safety performance, low pollution, etc. In the assembling process of battery modules, multiple cells are stacked into modules and then are connected by busbars.

At present, cells are generally placed on a carrier or a tray in the production process of battery modules, and then the compressing work for welding the cells is conducted by using the copper bar welding-and-compressing tool for the batteries. Such compressing mechanism has low efficiency in use and produces a low production efficiency of the batteries.

On one hand, an embodiment of the present disclosure provides a busbar welding device shown in FIG. 1, including a rack 100, a positioning mechanism 200, a compressing mechanism 300 and a welding mechanism 400. The positioning mechanism 200 is located at the bottom of the rack 100 and includes a base 210, a conveying mechanism 220 and a positioning plate 230. The conveying mechanism 220 is arranged on the base 210 and capable of conveying/receiving a battery module to/from the position above the positioning plate 230. A jacking part capable of elevating is arranged on the base 210. The jacking part may be a jacking cylinder and is capable of jacking the positioning plate for welding. The positioning plate 230 is located on the base 210 and capable of positioning the battery module in a length direction and a width direction. The compressing mechanism 300 includes pressing plates 310 movably arranged on the rack 100 and capable of movably compressing busbars of the battery module located on positioning plate 230. The welding mechanism 400 is movably arranged on the rack 100 and used for welding the busbars.

Referring to FIG. 1, the rack 100 includes first supporting beams 110 arranged along the length direction, second supporting beams 120 arranged along the width direction, and pillars 130. The first supporting beams 110 and the second supporting beams 120 are supported through the pillars 130. The first supporting beams 110 and the second supporting beams 120 and the pillars 130 are enclosed to form a three-dimensional framework, and at least one first supporting beam 110 or second supporting beam 120 are vertically arranged on the adjacent pillars 130 located in the same plane in a parallel manner. A space capable of accommodating the positioning mechanism 200 and the battery module is formed at the lower ends of the first supporting beams 110 and the second supporting beams 120. The first supporting beams 110 and the second supporting beams 120 may be used as movable supports of the compressing mechanism 300, the welding mechanism 400 and other mechanisms. The compressing mechanism 300 and the welding mechanism 400 are arranged in an area formed by the first supporting beams 110 and the second supporting beams 120, and the battery module is located in the area. After the battery module is well positioned, the compressing mechanism 300 and the welding mechanism 400 conduct movable positioning for compressing and welding.

Figure 5:
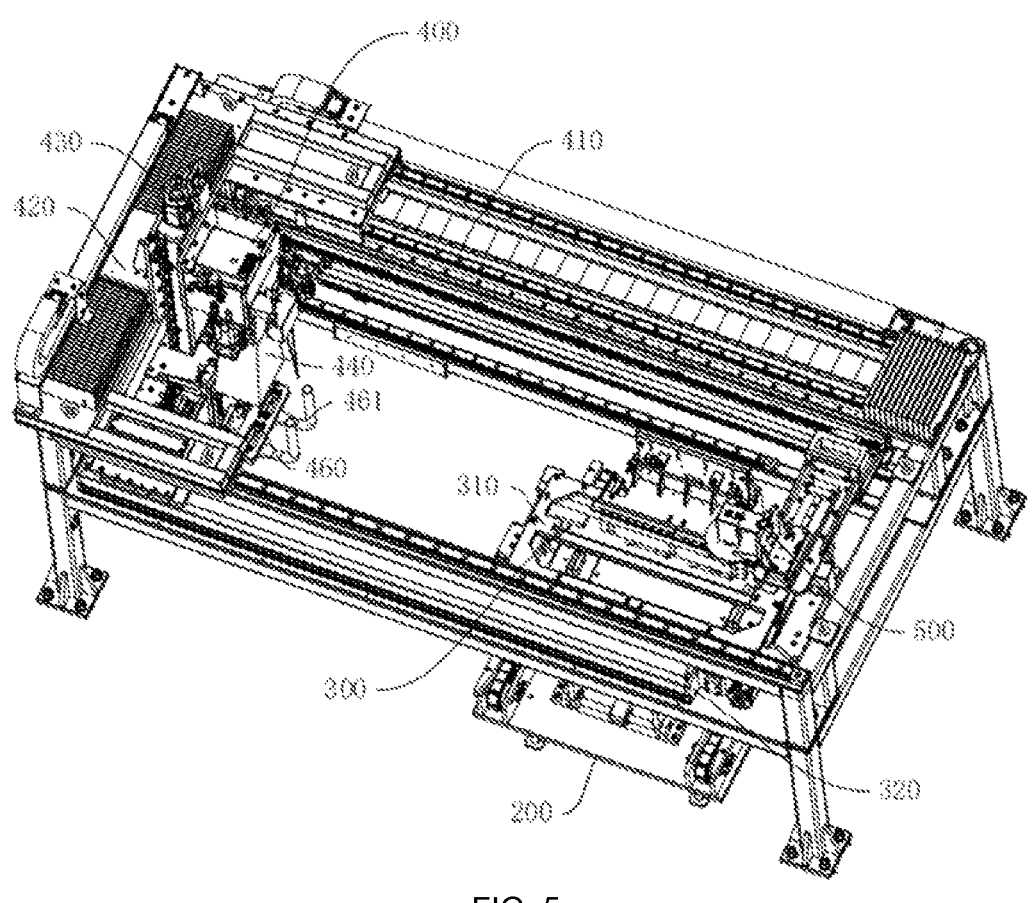
FIG. 5 is a schematic diagram 2 showing the busbar welding device in the embodiment of the present disclosure.
Figure 6:
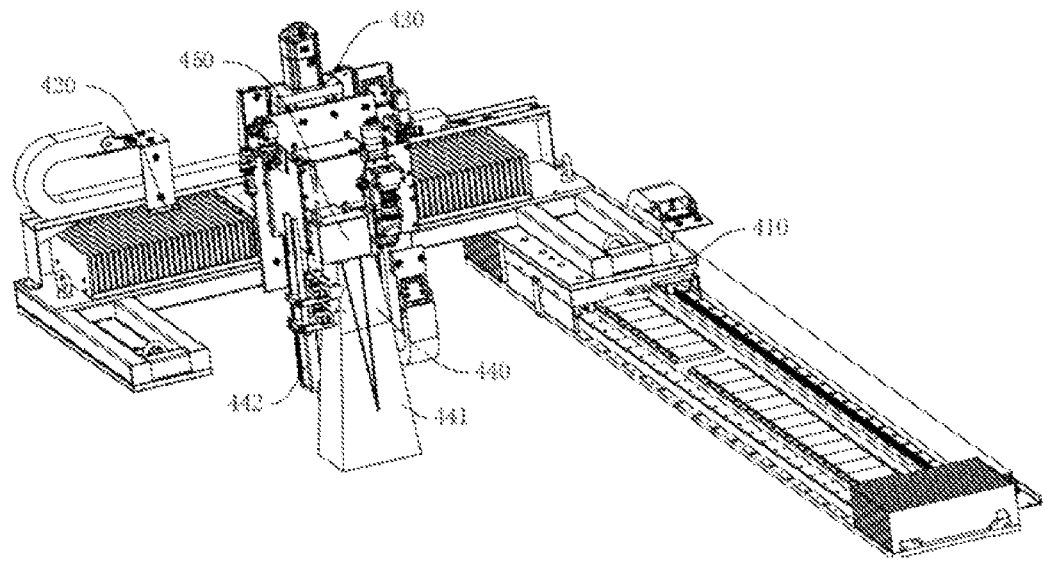
FIG. 6 is a schematic diagram showing the welding mechanism in the embodiment of the present disclosure.

Referring to FIG. 5 and FIG. 6, the welding mechanism 400 includes a first linear module 410, a second linear module 420, an elevating module 430 and a laser welding part 440. The first linear module 410 is arranged along the first supporting beams 120. The second linear module 420 is slidable along the first linear module 410. The elevating module 430 is movable along the second linear module 420 and capable of driving the laser welding part 440 to vertically move. Illustratively, the first linear module 410 is arranged on the first supporting beam 110 located at one side of the rack 100. The first linear module 410 may be a single-axis manipulator. A linear guide rail is arranged at the first supporting beam 110 located at the other side of the rack 100. The second linear module 420 may also be a single-axis manipulator. The second linear module 420 includes a base and a sliding part. One end of the base is mounted on a sliding part of the first linear module 410, and the other end of the base is mounted on a sliding block of the linear guide rail. The entire second linear module 420 can be driven to slide along the length direction of the first supporting beams 110 by the first linear module 410, and the linear guide rail arranged at the other side ensures sliding stability. The sliding part of the second linear module 420 and the elevating module 430 are connected. The sliding part of the second linear module 420 is arranged along the length direction of the second supporting beams 120 so as to drive the elevating module 430 to move along the length direction of the second supporting beams 120 by the second linear module 420. The elevating module 430 drives the laser welding part 440 to vertically move. Movement in a rectangular area formed by the first supporting beams 110 and the second supporting beams 120 can be realized by the first linear module 410 and the second linear module 420, and vertical movement can be realized by the elevating module 430 so that the laser welding part 440 can be adjusted to a required position for welding. Mounting and adjusting are very convenient through arrangement of the rack 100 and cooperation with all the linear modules.

The first linear module 410, the second linear module 420 and the elevating module 430 may all adopt a linear motor. The specific structures and settings can be configured according to the mounting requirements and will not be described here.

Referring to FIG. 6, the laser welding pat 440 includes a laser module 441 and an air knife 442 arranged at one side of the laser module 441. Illustratively, the laser welding pat 440 is arranged at an output end of the elevating module 430. The elevating module 430 drives the laser welding pat 440 to elevate to the welding position. The elevating module 430 may be equipped with brake settings. The laser module 441 includes a field lens, a collimating lens and an oscillating lens and can be used for controlling laser beams to conduct laser welding. The air knife 442 is arranged at one side of the laser module 441 and may be equipped with a fluid control valve. The air knife 442 can be used for protector blowing and dust removing so as to improve the welding quality.

That is, the positioning mechanism 200 firstly position the battery module in the length direction and the width direction through the positioning plate 230, and then the busbars of the positioned battery module are compressed through the compressing mechanism 300 so as to achieve the technical effects that the pressing plates of the compressing mechanism 300 can compress and fix all the busbars in one step, the use efficiency of the compressing mechanism 300, and thus the production efficiency of the battery module is improved and the welding precision can be guaranteed.

Figure 4:
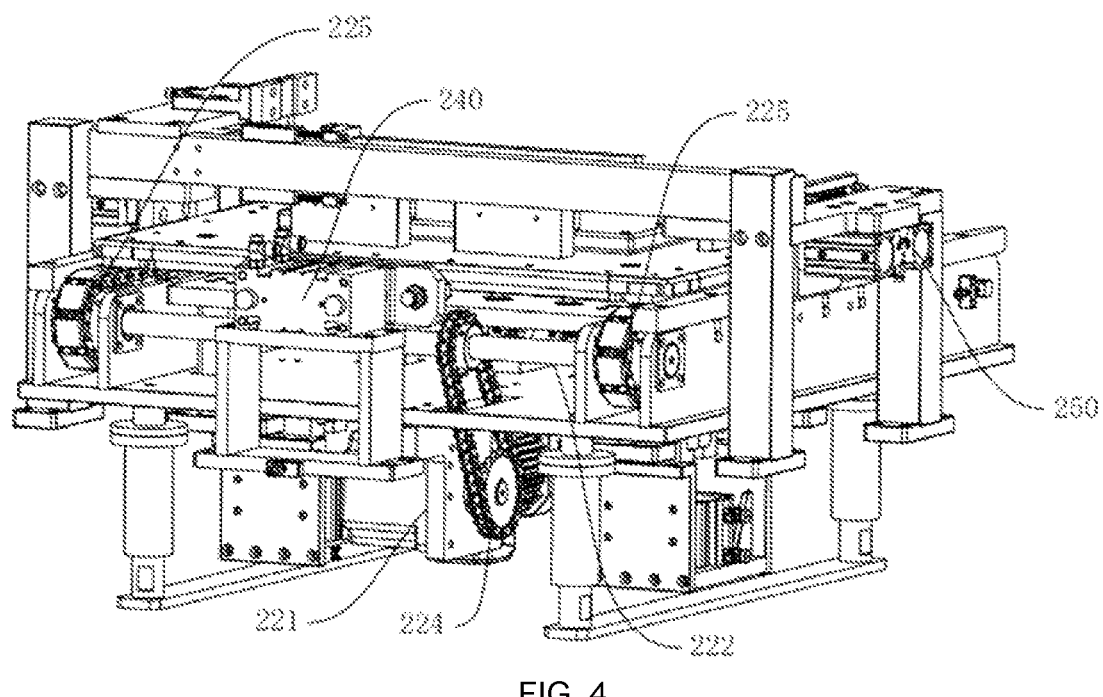
FIG. 4 is a schematic diagram 3 showing the positioning mechanism of the embodiment of the present disclosure.

Referring to FIG. 4, the positioning plate 230 and the base 210 are both square plates. Mounting plates extending along spaced long sides are arranged at the two sides of the long sides of the bottom face of the base 210 and form a mounting area. The conveying mechanism 220 includes a third drive member 221, a conveying main shaft 222 and first conveying chain components 223. Each first conveying chain component 223 includes two first chain wheels and a conveying chain. The first conveying chain is arranged in the mounting area along the length direction of the mounting area in a revolving manner. The third drive member 221 can be mounted at the bottom of the base 210. The third drive member 221 can be a motor. The conveying main shaft 222 is arranged in a way of extending along the wide side of the base 210. The conveying main shaft 222 and the third drive member 221 are connected through second conveying chain components 224. One first chain wheel is mounted at the two ends of the conveying main shaft 222. Each second conveying chain component 224 includes two second chain wheels and a second conveying chain. One second chain wheel is arranged at an output shaft of the third drive member 221, one second chain wheel is arranged on the conveying main shaft 222, and two ends of the second conveying chain surround the two second chain wheels respectively. Therefore, the third drive member 221 drives the second conveying chain components 224 to conduct driving, the second conveying chain components 224 drive the conveying main shaft 222 to rotate and finally drive the first conveying chain components 223 to conduct transmission.

Figure 2:
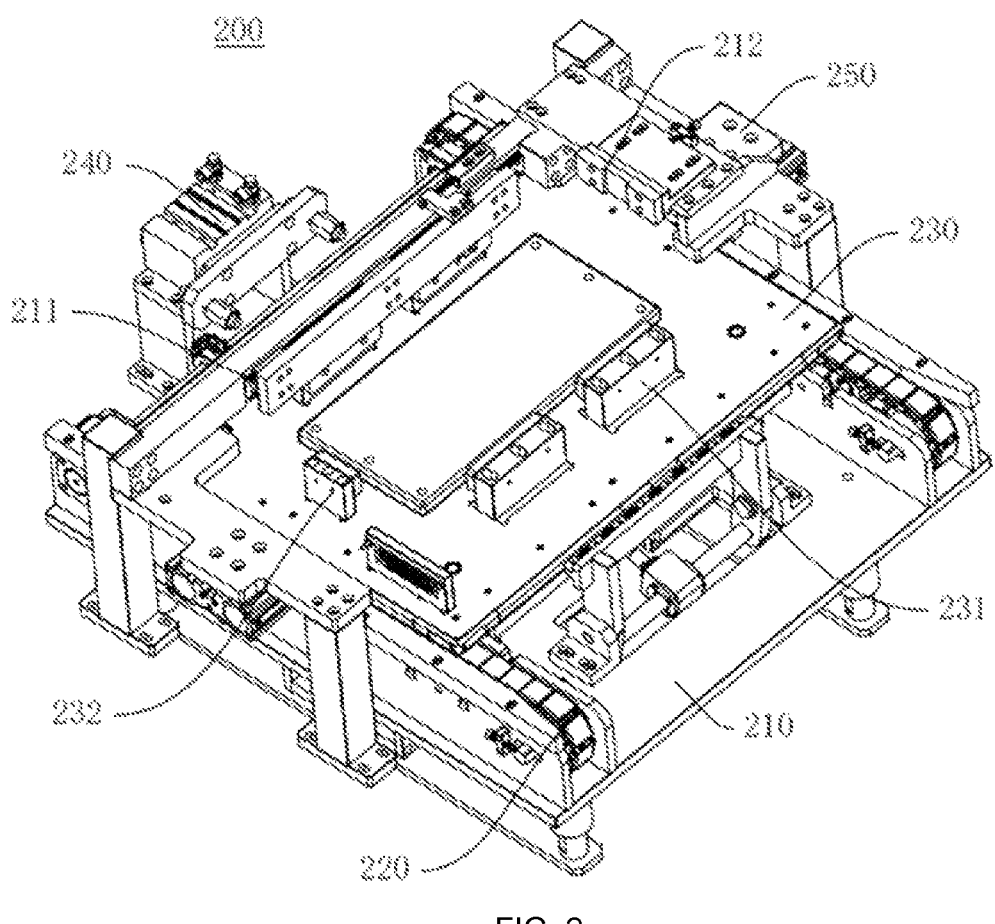
FIG. 2 is a schematic diagram 1 showing the positioning mechanism in the embodiment of the present disclosure.
Figure 3:
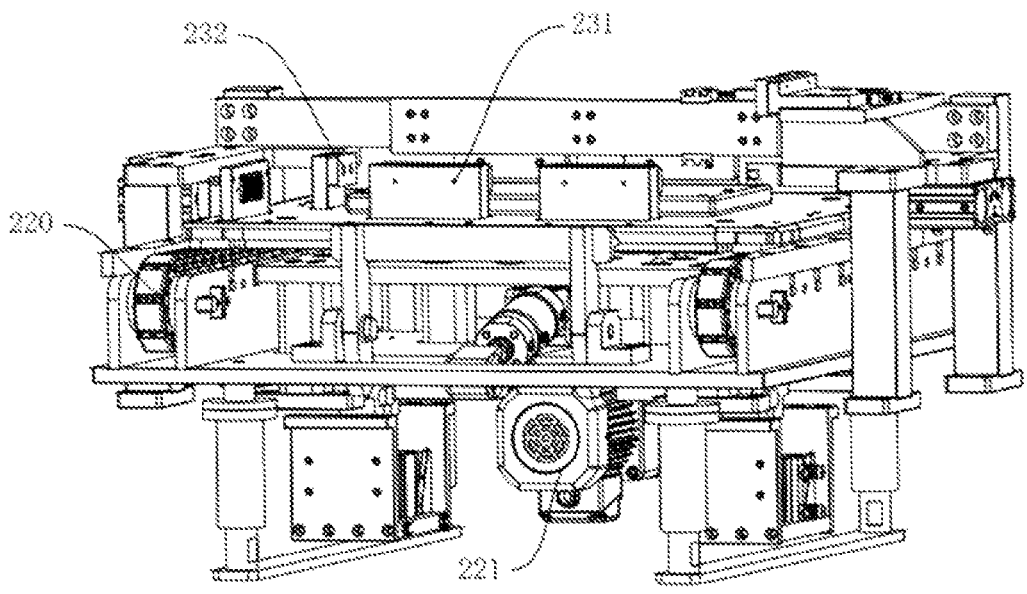
FIG. 3 is a schematic diagram 2 showing the positioning mechanism in the embodiment of the present disclosure.

Referring to FIG. 2 and FIG. 3, a first benchmark part 231 arranged along the length direction of the positioning plate 230 and a second benchmark part 232 arranged along the width direction of the positioning plate 230 are provided on the positioning plate 230. A first positioning plate 211 opposite to the first benchmark part 231 is arranged on the base 210 and capable of moving close to or away from the first benchmark part 231. A second positioning plate 212 corresponding to the second benchmark part 232 is arranged on the base 210 and capable of moving close to or away from the second benchmark part 232. Specifically, the first benchmark part 231 is convexly arranged on the positioning plate 230. The first benchmark part 231 can limit the length direction of the battery module and the second benchmark part 232 can limit the width direction of the battery module. The first benchmark part 231 can be a block, or a plate or a column, as long as it can meet the requirement for limiting the length direction of the battery module, i.e. the second benchmark part 232 can also be a block, or a plate or a column. The first benchmark part 231 and the second benchmark part 232 are cooperated to limit the battery module and are fixedly arranged so as to limit the position of the battery module to be close to the first benchmark part 231 and the second benchmark part 232.

The first positioning part 211 is opposite to the first benchmark part 231, and the first positioning part 211 relatively moves along the linear direction so as to be close to or away from the first benchmark part 231 to be cooperated with the first benchmark part 231 for positioning. The second positioning part 212 is opposite to the second benchmark part 232, and the second positioning part 212 relatively moves along the linear direction so as to be close to or away from the second benchmark part 232 to be cooperated with the second benchmark part 232 for positioning.

Specifically, the positioning mechanism 200 includes a first drive member 240 and a second drive member 250. The first drive member 240 is used for driving the first positioning part 211 to move along the length direction, and the second drive member 250 is used for driving the second positioning part 212 to move along the width direction. The first drive member 240 and the second drive member 250 are both linear cylinders. The first positioning plate 211 and the second positioning plate 212 are limiting plates. The limiting plates are driven to move for positioning by the linear cylinders.

In some embodiments, the welding mechanism 400 further includes ranging components 450 which are located at one side of the laser welding part 440. The ranging components can detect the precision of multiple points and can be distance measuring instrument. The laser module conducts welding after the ranging components 340 conduct distance ranging.

The welding mechanism 400 further includes a copper mouth pressing head module 460 capable of moving along the length direction of the first supporting beams 110. The copper mouth pressing head module 460 includes a copper mouth pressing block 461 used for compressing a single busbar. The copper mouth pressing block 461 can be used for dust drawing. The copper mouth pressing block of the copper mouth pressing head module 460 can fix and compress the busbars for welding, so as to improve the welding quality, and dust drawing can be realized through a copper mouth pressing block 461. Naturally, the copper mouth pressing head module 460 may also be equipped with a pressure sensor, and the copper mouth pressing block 461 may also be equipped with an elastic member, such as a compressing spring, for avoiding the situation of overpressure.

Referring to FIG. 5, the compressing mechanism 300 further includes a first linear component 320 which drives the pressing plates 310 to move along the length direction of the battery module. The shape of the pressing plates 310 is that multiple long strips are connected along the direction of the busbars, and the pressing plates 310 are driven to move by the first linear component 320. The positioning plate is jacked by the jacking part so as to compress the busbars by the pressing plates 310.

Referring to FIG. 5, the busbar welding device further includes a visual positioning module 500 capable of moving along the length direction and the width direction of the battery module so as to position the welding position. The visual positioning module 500 is a CCD addressing camera capable of moving along the length direction of the first supporting beams and the second supporting beams so that the CCD addressing camera can be moved for addressing to detect whether the camera's visual field meets the welding requirements of the busbars, and visually position the welding position.

The embodiments of the present disclosure are described in detail above with reference to the accompanying drawings, but the present disclosure is not limited to the abovementioned embodiments. Within the scope of knowledge possessed by those of ordinary skill in the technical field, the present disclosure can also be used by making various changes without departing from the purpose of the present disclosure.

The invention claimed is:

1. A busbar welding device, comprising:

a rack;

a positioning mechanism, located at a bottom of the rack, comprising a base, a conveying mechanism and a positioning plate, wherein the conveying mechanism is arranged on the base and capable of conveying/receiving a battery module to/from a position above the positioning plate, a jacking part capable of elevating is arranged on the base, the positioning plate is located on the base and capable of positioning the battery module in a length direction and a width direction;

a compressing mechanism, comprising pressing plates movably arranged on the rack and capable of movably compressing busbars of the battery module located on the positioning plate; and a welding mechanism, movably arranged on the rack and configured for welding the busbars, wherein:

the rack comprises first supporting beams arranged along the length direction and second supporting beams arranged along the width direction and pillars, the first supporting beams and the second supporting beams are supported through the pillars, the welding mechanism comprises a first linear module, a second linear module, an elevating module and a laser welding part, the first linear module is arranged along the first supporting beams, the second linear module is slidable along the first linear module, the elevating module comprises a linear motor and is movable along the second linear module and drives the laser welding part to vertically move.

2. The busbar welding device according to claim 1, wherein a first benchmark part arranged along a length direction of the positioning plate and a second benchmark part arranged along a width direction of the positioning plate are provided on the positioning plate, a first positioning part opposite to the first benchmark part and capable of moving close to or away from the first benchmark part is arranged on the base, and a second positioning part corresponding to the second benchmark part and capable of moving close to or away from the second benchmark part is arranged on the base.

3. The busbar welding device according to claim 2, wherein the positioning mechanism comprises a first drive member and a second drive member, wherein the first drive member is configured for driving the first positioning part to move along the length direction, and the second drive member is configured for driving the second positioning part to move along the width direction.

4. The busbar welding device according to claim 1, wherein the conveying mechanism comprises a third drive member, a conveying main shaft and first conveying chain components, the first conveying chain components are arranged at two opposite sides of the base, the conveying main shaft and the conveying chain components are connected through second conveying chain components, and one end of each first conveying chain component is rotatably connected with the conveying main shaft.

5. The busbar welding device according to claim 1, wherein the laser welding part comprises a laser module and an air knife arranged at one side of the laser module.

6. The busbar welding device according to claim 1, wherein the welding mechanism further comprises a ranging component which is located at one side of the laser welding part.

7. The busbar welding device according to claim 1, wherein the welding mechanism further comprises a copper mouth pressing head module which can move along a length direction of the first supporting beams and comprises a copper mouth pressing block capable of compressing a single busbar, and the copper mouth pressing block is configured for dust drawing.

8. The busbar welding device according to claim 1, wherein the compressing mechanism further comprises a first linear component which drives the pressing plates to move along a length direction of the battery module.

9. The busbar welding device according to claim 1, further comprising a visual positioning module capable of moving along a length direction and a width direction of the battery module so as to position a welding position.

\* \* \* \* \*